April 19, 1949.　　　　D. H. ANNIN　　　　2,467,365
LIQUID LEVEL INDICATING APPARATUS
Filed June 4, 1945　　　　　　　　　　　　2 Sheets-Sheet 1
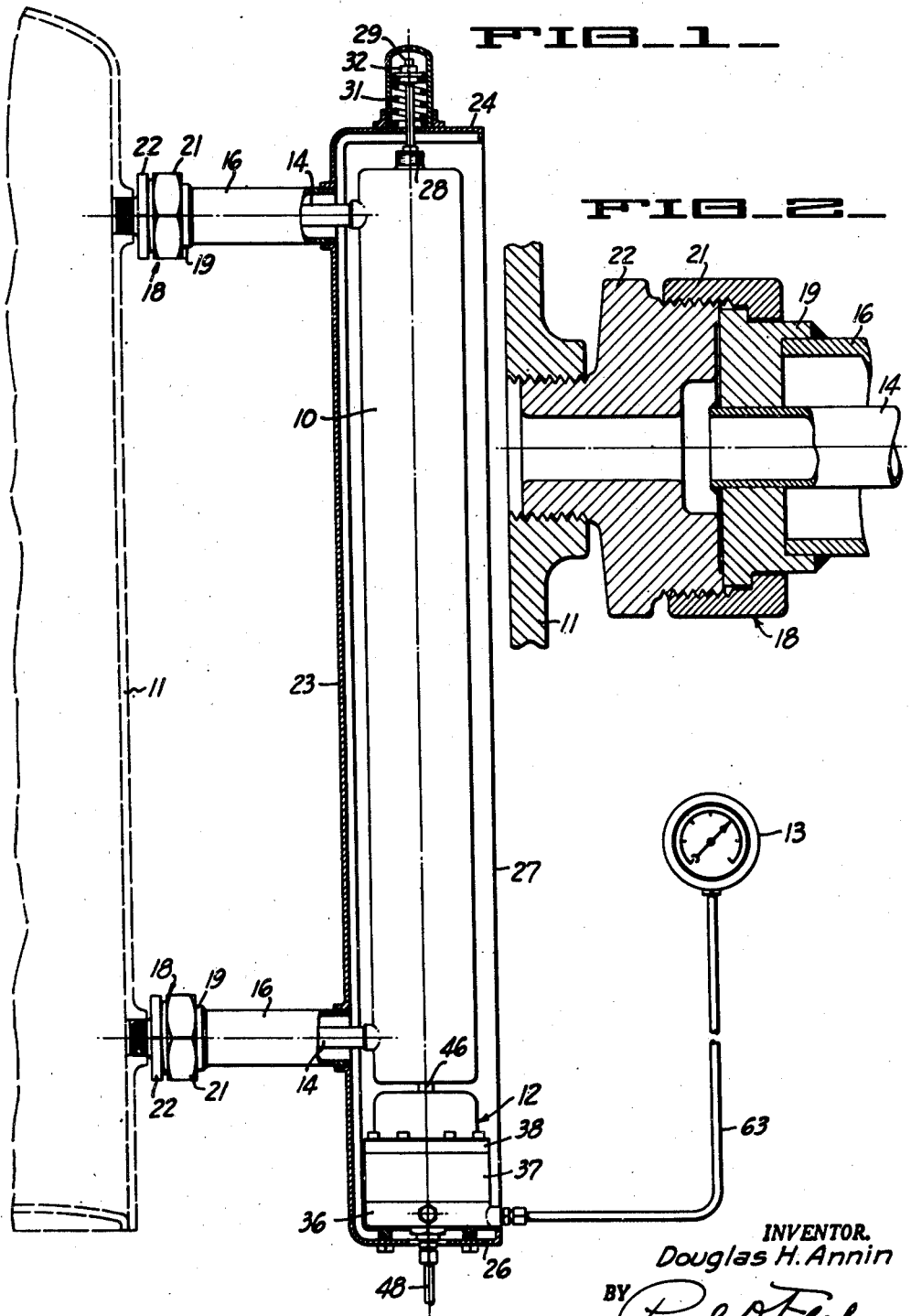
INVENTOR.
Douglas H. Annin
BY
ATTORNEY

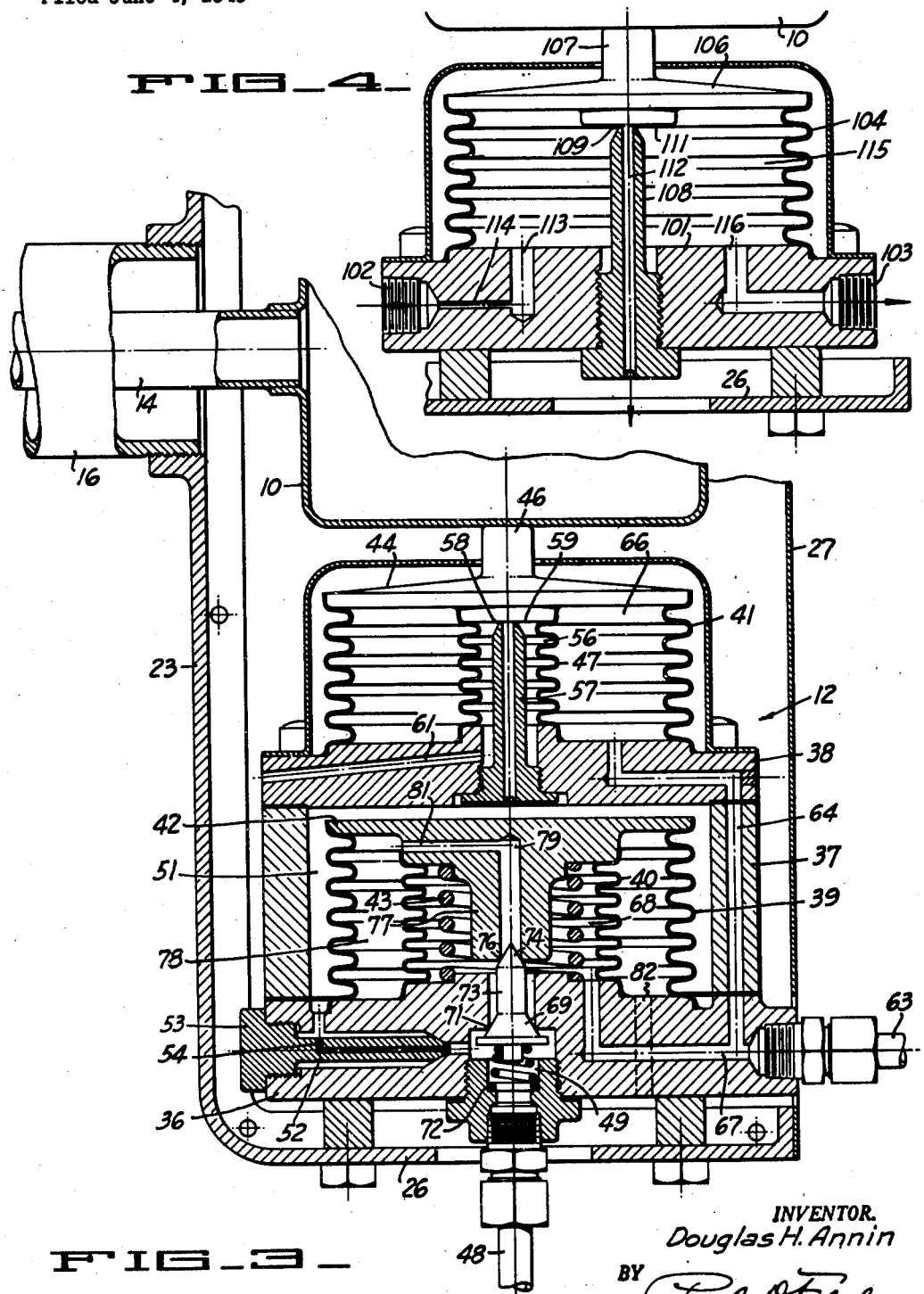

Patented Apr. 19, 1949

2,467,365

UNITED STATES PATENT OFFICE 2,467,365

LIQUID LEVEL INDICATING APPARATUS

Douglas H. Annin, Oakland, Calif., assignor to Grove Regulator Company, Oakland, Calif., a corporation of California Application June 4, 1945, Serial No. 597,554

2 Claims. (Cl. 73—296)

1

This invention relates generally to apparatus for indicating or measuring the level of liquid in a tank or vessel.

It is an object of the invention to provide apparatus of the above character capable of accurately indicating or measuring liquid level, and which is adapted for use with closed tanks operating at relatively high pressures and temperatures.

A further object of the invention is to provide liquid level indicating means which will dispense with use of conventional packing glands, diaphragms, torsion tubes or like sealing means between relatively movable parts.

A further object of the invention is to provide a novel type of pneumatic indicating means operating upon the null principle, for the purpose of indicating or measuring variations in the liquid level.

Additional objects of the invention will appear from the following description in which the preferred embodiment has been set forth in detail in conjunction with the accompanying drawing.

Referring to the drawing:

Figure 1 is a side elevational view partly in cross-section, illustrating apparatus incorporating the present invention.

Figure 2 is an enlarged detail in section illustrating suitable means for connecting certain parts of the apparatus to a liquid tank or vessel.

Figure 3 is an enlarged detail in section illustrating suitable pneumatic balancing means of the null type incorporated in conjunction with the apparatus.

Figure 4 is an enlarged view in section showing a modified type of pneumatic balancing means.

The apparatus illustrated in the drawing consists generally of a closed vertical tube 10 having special connections with a tank 11, and operatively connected with a pneumatic device 12. The pneumatic device may connect to any one of a variety of devices or instruments for effecting a measurement, indication or response in accordance with liquid level, as for example a pressure gauge 13. Device 12 is of the null type, operated by very slight vertical movements of the tube 10, and functions to automatically restore tube 10 to normal balanced position after the balance has been upset by an increase or decrease of the amount of water in the tube.

The connection between tube 10 and the tank 11 completely eliminates conventional expedients such as packing glands, torsion tubes, diaphragms and the like, and makes use of simple straight parallel metal tubes 14. These tubes are rigidly

2 attached to one side wall of the tube 10, as by means of welding or silver soldering, and they are also rigidly attached to the side wall of the tank 11, in such a manner that the tube 10 is placed in communication with the interior of tank 11 at spaced points.

In order to protect tubes 10 and 14 from injury, and for the mounting of certain parts to be presently described, tubes 14 are enclosed within the pipes 16, which in turn have suitable rigid attachment to the side wall of the tank. In the particular construction illustrated in Figure 2 a union 18 is provided, with corresponding ends of the tubes 14 and 16 being attached by welding or soldering to the union part 19. Union part 19 is clamped by ferrule 21 to the union part 22, which in turn is shown with a threaded connection into the side wall of tank 11.

The outer ends of pipe 16 connect with a suitable frame or housing for the tube 10, which can consist for example of the vertical channel 23. The upper and lower end portions 24 and 26 of this channel are bent laterally to extend above and below the ends of tube 10. A cover 27 of sheet metal can be attached to the channel 23, thus completing a protective housing for the tube 10.

The upper end of the tube 10 is preferably connected to suitable counterbalancing means whereby the weight of this tube can be balanced out. For this purpose the upper end of tube 10 has a pivotal connection 28 with a rod 29, which in turn extends through the compression spring 31. The lower end of spring 31 is seated upon the upper channel part 24, while its upper end is engaged by a washer beneath a nut 32, which is threaded on rod 29. Thus by turning nut 32 the counterbalancing effect of spring 31 can be adjusted to a desired value.

The pneumatic device 12 shown in Figure 3 consists of a base member 36 mounted upon the channel part 26. Mounted upon the member 36 there is a shell 37 having its upper end closed by the plate 38. Two Sylphon tubes 39 and 40 are disposed within the shell 37, and a third Sylphon 41 is mounted above the plate 38. The lower ends of Sylphons 39 and 40 are secured to and sealed with respect to the base plate 36, and their upper ends are secured to and sealed with respect to a thrust plate 42. Within the Sylphon 40 there is a compression spring 43 which normally urges plate 42 upwardly.

Sylphon 41 has its lower end secured to and sealed with respect to plate 38, and its upper end is secured to and sealed with respect to plate 44. The center of plate 44 carries the member 46 which has abutting engagement with the lower end of tube 10. Within the Sylphon 41 there is another relatively smaller Sylphon 47, which has its lower end secured and sealed with respect to plate 38, and its upper end secured and sealed with respect to plate 44.

Pipe 48 is connected to a suitable source of high pressure air or like gas, and is directly connected with the space 49 in base plate 36. This space has restricted communication with the space 51 surrounding Sylphon 39, through a suitable restricted orifice such as is formed by the tube 52 which is carried upon the inner end of the removable plug 53. Tube 52 has its one end in communication with space 49, and near its other end it is provided with a small lateral orifice 54, which permits restricted communication with space 51.

Space 51 surrounding Sylphon 39 is in valve controlled communication with the space 56 within the Sylphon 47. Thus within Sylphon 47 there is a tube 57 which communicates with the space 51 at a point above the center of plate 42, and which at its upper end is provided with the annular valve surface 58. This valve surface or seat is adapted to engage and cooperate with the adjacent surface 59, carried by the plate 44 within tube 47. Thus slight raising movement of plate 44 results in venting of air from tube 57 into the space 56, and downward movement to cause engagement of surfaces 58 and 59 interrupts or restricts such communication. Space 56 is vented to the atmosphere through the duct 61.

The pressure gauge 13, which indicates the liquid level, is connected to base plate 36 by pipe 63. This pipe communicates through duct 64 with the space 66 within the Sylphon 41. It also communicates through duct 67 with the space 68 within the Sylphon 40. Flow of air from space 49 into space 68 is controlled by a valve member 69 cooperating with the stationary seat 71. This valve member is urged upwardly towards closed position by the compression spring 72.

Valve member 69 carries an extension 73, the upper end of which forms the valve member 74. A seat 76 cooperates with valve member 74, and is formed upon the lower end of an extension 77 which extends downwardly from the center of plate 42. The valve orifice through seat 76 communicates with space 78 between the Sylphons 39 and 40, through the ducts 79 and 81. Space 78 is continuously vented to the atmosphere through duct 82.

Assuming an initial condition in which all of the valve members of device 12 are closed, it will be apparent that a downward movement of plate 42 results in opening of valve member 69, whereas upward movement of plate 42 causes opening of valve member 74. The pressure existing in chambers 66 and 68 determines the reading of the pressure gauge 13.

Operation of the apparatus described above can be explained as follows: Counterbalancing spring 31 is adjusted to completely counterbalance the weight of tube 10 whereby without liquid within the same the tubes 14 are completely unstressed. Liquid entering tube 10 will take a level corresponding to that within the tank, due to the free communication of this tube with the tank through the horizontal tubes 14. Tube 48 is connected to a source of air which should be at a pressure generally above the highest pressure reading of gauge 13. Under conditions of equilibrium gauge 13 indicates a pressure corresponding to the level of liquid within tube 10 and tubes 14 are substantially unstressed. Assuming that there is a drop in liquid level, tube 10 is made lighter and as a result there is a slight upward movement of this tube well within the limits of lateral flexibility of the metal tubes 14. Such slight upward movement causes an opening of valve surface 59 with respect to seat 58, and as a result an increased amount of air is vented from chamber 51 through tube 57, and to the atmosphere through passage 61. Because of the restricted orifice 54 this causes an immediate drop in pressure within chamber 51, which results in a slight upward movement of plate 42 to open valve member 74 with respect to seat 76. Such opening movement increases venting of air from chamber 68 (and also chamber 66) past valve 74 through ducts 79 and 81 and from thence through chamber 78, to the atmosphere through duct 82. Thus a corresponding change in the indicating pressure occurs, which is immediately registered by the gauge 13. Drop of pressure in chamber 66 serves to restore the plate 44, and likewise the tube 10, to approximately its initial position. Should there be an increase in liquid level tube 10 is made heavier, and as a result there is slight downward movement of the same well within the limits of flexibility of tube 14. Such downward movement effects temporary closing or complete shut off of valve seat 58 with respect to surface 59, thus causing pressure to build up in chamber 51. Building up of pressure in this chamber causes plate 42 to be moved downwardly thus causing an opening of valve member 69 with respect to seat 71, to admit high pressure air from pipe 48 into space 68. Sufficient air is admitted in this fashion until equilibrium conditions are restored, and restoration of equilibrium involves an increase of pressure in chamber 66 to again restore tube 10 to its initial position. The new pressure in chambers 66 and 68 is indicated by the reading of pressure gauge 13.

The pneumatic device 12 described above is capable of supplying adequate amounts of air to an extended pipe 63, thus minimizing lag in the readings of the gauge 13, should this gauge be located a considerable distance away.

A particular feature of my invention is the use of simple horizontal parallel tubes 14 connecting the vertical tube 10 at spaced vertical points with the tank 11. These tubes 14 together with tube 10 can be made of suitable metal, such as stainless steel, phosphor bronze or the like, capable of withstanding relatively high pressures. With a pneumatic device 12 of the null type, lateral flexibility of these tubes can be at a minimum. In fact vertical movement of the tube 10 within a latitude of 0.02 inch will suffice for operation of the device 12 for full range indication of the gauge 13. As previously explained the counterbalancing spring 31 offsets the weight of the tube 10, and the normal balanced position for equilibrium of device 12 corresponds to completely unstressed position of tubes 14. Nominal stressing occurs well within the elastic limits of tubes 14 during temporary periods when the balance has been disturbed and the pneumatic device 12 is being restored to balanced condition. It will be evident that this makes for accurate response while at the same time it enables application of relatively high pressures where conventional equipment would be impractical. Also the apparatus is applicable to high temperature services, with or without corresponding high pressure.

Figure 4 illustrates a simplified type of pneumatic balancing device which is likewise of the null type. This device eliminates the booster arrangement incorporated in Figure 3. Briefly the simplified device of Figure 4 consists of a base or body member 101 which has a passage 102 adapted for connection with the air supply pipe 48 (Figure 1) and also a passage 103 adapted for connection with pipe 63 and gauge 13. A Sylphon 104 is mounted upon base 101, and the upper end plate 106 of this Sylphon has a thrust member 107 which engages the lower end of the tube 10. Mounted on and extending upwardly from base 101 there is a nozzle 108 having its upper end forming a seat 109 for cooperation with the disc 111 on the plate 106. The orifice through seat 109 vents to the atmosphere through the nozzle passage 112. Duct 113 and restricted passage 114 connect passage 102 with the space 115 in Sylphon 104. Duct 116 also connects passage 103 with space 115.

Operation of the device shown in Figure 4 is somewhat similar to that of Figure 3 except for elimination of the booster function. Normally the device assumes a balanced position whereby the pressure within the Sylphon assumes a value which is transmitted to the gauge, and which indicates the liquid level in tube 10. This balance is maintained by controlled venting of air in chamber 115 through the nozzle passage 112. Assuming an increase in liquid level, tube 10 moves downwardly a slight amount to restrict venting past seat 109 and thus causing pressure to be built up in chamber 115 until pressure is sufficient to again balance tube 10 and restore this tube to normal balanced position. This increased pressure is transmitted to the gauge as previously explained. A lowering of the liquid level likewise upsets the balance of the device by causing an upward movement of disc 111 which results in increased venting from chamber 115 to the atmosphere. When equilibrium is restored, the tube 10 has again been caused to return to a normal position and the pressure now being maintained in chamber 115 as read by the pressure gauge 13, indicates the lower level. Irrespective of the liquid level being indicated, the normal balanced position of tube 10 is substantially the same whereby tubes 14 remain substantially unstressed. Thus changes in internal pressure or temperature have no effect upon accuracy of indication, because they do not serve to create forces applied to the tube 10 and tending to raise or lower the same.

I claim:

1. In liquid level indicating apparatus adapted for use with a liquid tank having an upright side wall, a pair of ported fittings adapted to be attached to the side wall of the tank for communicating with the interior of the same at vertically spaced points, a pair of straight concentric tubular metal members attached to each fitting and extending horizontally from the same, the inner tube of each pair being in communication with the associated fitting port and being capable of slight lateral bending within its elastic limit, a vertically extending frame having its upper and lower end portions attached to the ends of the outer tubes of each pair, a closed tubular container of substantial height disposed vertically within the frame and having its upper and lower end portions rigidly attached to the adjacent ends of the inner tubes, and pneumatic balancing means of the null type carried by the frame and having a thrust transmitting member operatively connected to said tubular member, said last means being responsive to the amount of liquid in the container and serving to maintain the normal level of the container in such a position that the inner tubes of each pair are normally substantially unstressed.

2. In liquid level indicating apparatus adapted for use with a liquid tank having an upright side wall, a pair of ported fittings adapted to be attached to the side wall for communicating with the interior of the tank at vertically spaced points, a pair of straight concentric tubular metal members attached to each fitting and extending horizontally from the same, the inner tube of each pair being in communication with the associated fitting port and being capable of slight lateral bending within its elastic limit, the outer tube of each pair being relatively rigid, the axes of the two pairs of tubes being parallel, a vertically extending frame having its upper and lower end portions attached to the adjacent ends of the outer tubes of each pair, a closed tubular container of substantial height disposed vertically within the frame and having its upper and lower portions rigidly attached to the adjacent ends of the inner tubes, a spring means carried by the upper portion of the frame and acting between the frame and the tubular container to oppose the weight of the latter, and pneumatic balancing means of the null type mounted on the lower portion of the frame and having a thrust transmitting member operatively connected to said tubular container, said last means being responsive to the amount of liquid in the container and serving to maintain the normal level of the container in such a position that the parallel horizontal tubes are normally substantially unstressed.

DOUGLAS H. ANNIN.

REFERENCES CITED

The following references are of record in the file of this patent:

UNITED STATES PATENTS

| Number | Name | Date |
| --- | --- | --- |
| 274,103 | Ayres | Mar. 20, 1883 |
| 1,237,478 | Clift | Aug. 21, 1917 |
| 1,559,357 | O'Neill | Oct. 27, 1925 |
| 2,040,357 | Chalatow | May 12, 1936 |
| 2,248,322 | Annin | July 8, 1941 |
| 2,342,696 | Rover | Feb. 29, 1944 |

FOREIGN PATENTS

| Number | Country | Date |
| --- | --- | --- |
| 670,571 | Germany | Jan. 20, 1939 |
| 676,406 | France | Nov. 28, 1929 |